(12) United States Patent
Kloer

(10) Patent No.: US 7,933,451 B2
(45) Date of Patent: Apr. 26, 2011

(54) FEATURE EXTRACTION USING PIXEL-LEVEL AND OBJECT-LEVEL ANALYSIS

(75) Inventor: Brian Kloer, Lawrenceville, GA (US)

(73) Assignee: Leica Geosystems AG, Heerbrugg (CH)

( * ) Notice: Subject to any disclaimer, the term of this patent is extended or adjusted under 35 U.S.C. 154(b) by 1142 days.

(21) Appl. No.: 11/559,237

(22) Filed: Nov. 13, 2006

(65) Prior Publication Data

US 2007/0116365 A1 May 24, 2007

Related U.S. Application Data

(60) Provisional application No. 60/739,650, filed on Nov. 23, 2005.

(51) Int. Cl.
*G06K 9/46* (2006.01)
(52) U.S. Cl. ........................................... 382/190
(58) Field of Classification Search .................. 382/190, 382/200, 206, 256, 259, 181, 223
See application file for complete search history.

(56) References Cited

U.S. PATENT DOCUMENTS

| | | | |
|---|---|---|---|
| 4,685,068 A | 8/1987 | Greco, II et al. | |
| 5,631,970 A | 5/1997 | Hsu | |
| 5,640,468 A | 6/1997 | Hsu | |
| 5,719,949 A | 2/1998 | Koeln et al. | |
| 5,751,852 A | 5/1998 | Marimont et al. | |
| 6,014,614 A | 1/2000 | Herring et al. | |
| 6,151,424 A | 11/2000 | Hsu | |
| 6,404,920 B1 | 6/2002 | Hsu | |
| 6,577,757 B1 * | 6/2003 | DeYong et al. | 382/149 |
| 6,604,126 B2 | 8/2003 | Neiman et al. | |
| 6,804,394 B1 | 10/2004 | Hsu | |
| 6,876,999 B2 | 4/2005 | Hill et al. | |

(Continued)

FOREIGN PATENT DOCUMENTS

WO WO 99/23600 5/1999

OTHER PUBLICATIONS

E Saber et al.: "Integration of color, edge, shape, and texture features for automatic region-based image annotation and retrieval," Journal of Electronic Imaging, Jul. 1998, vol. 7, No. 3, pp. 684-700.

(Continued)

*Primary Examiner* — Samir A Ahmed
*Assistant Examiner* — Edward Park
(74) *Attorney, Agent, or Firm* — Maschoff Gilmore & Israelsen

(57) ABSTRACT

Image processing for extracting features in images. Pixel-level cue algorithms can be performed on raster images. The raster images can be converted to a vector layer. Object-level cue algorithms can be performed on the vector layer. The feature can be detected using a result of the pixel-level cues and using a result of the object-level cue algorithms performed. A computer-readable medium can include a first data field containing data representing pixel-level cues functioning to describe a pixel-level cue of the feature. The computer-readable medium can also include a second data field containing data representing object-level cues functioning to describe the object-level cues of the feature. Relation-level cue algorithms can be performed on the vector layers. The features can be detected using a result of any combination of the pixel-level cue algorithms, object-level cue algorithms, and/or relation-level cue algorithms.

14 Claims, 10 Drawing Sheets

U.S. PATENT DOCUMENTS

| | | |
|---|---|---|
| 2003/0026484 A1 | 2/2003 | O'Neill |
| 2003/0223615 A1 | 12/2003 | Keaton et al. |
| 2004/0008866 A1 | 1/2004 | Rhoads et al. |
| 2004/0213459 A1 | 10/2004 | Ishimaru et al. |
| 2005/0238244 A1* | 10/2005 | Uzawa ............... 382/242 |

OTHER PUBLICATIONS

Bertolotto et al.: "Using sketches and knowledge bases for geospatial image retrieval," Computers Environment and Urban Systems, New York, NY, US, Mar. 2005, vol. 30, No. 1, pp. 29-53.

Lee G et al.: "Automated selection of vision operator libraries with evolutionary algorithms," Evolutionary Computation, 2004, CEC2004, Congress on Portland, OR, US, Jun. 19-23, 2004, Piscataway, NJ, US, IEEE, vol. 1, Jun. 19, 2004, pp. 1127-1134.

Marti J et al.: "Model-based objects recognition in man-made environments," Robot and Human Communication, 1996, 5th IEEE International Workshop on Tsukuba, Japan, Nov. 11-14, 1996, New York, NY, US, IEEE, US, Nov. 11, 1996, pp. 358-363.

Carmichael O. et al.: "A Hybrid Object-Level/Pixel-Level Framework for Shape-based Recognition," Proceedings British Machine Vision Conference (BMVC), 2004, pp. 1-10.

Campbell N W et al.: "Interpreting image databases by region classification," Pattern Recognition, Elsevier, Kidlington, GB, Apr. 1997, vol. 30, No. 4, pp. 555-563.

Elisabettal Binaghi, Ignaziol Gallo, Monica Pepe. *A Cognitive Pyramid for contextual Classification of Remote Sensing Images*. Source: IEEE Transactions on Geoscience & Remote Sensing; Dec. 2003 Part 1 of 2, vol. 41 Issue 12, p. 2906-2922, 17p.

K. Aizawa, K. Sakaue, Y. Suenaga. *Image Processing Technologies: Algorithms, Sensors and Applications* (Book). Source: Mechanical Engineering; Oct. 2004, vol. 126 Issue 10, p. 68-68, 1/8p.

R. Narayanaswamy and O.S. Wolfbeis. *Optical Sensors: Industrial, Environmental, and Diagnostic Applications*. Springer Verlag N.Y., Inc., 175 Fifth Avenue, New York, NY 10010. 421 pages. 2004. ISBN 3-540-40886-.

Ruvimbo Gamanya, Philippe De Maeyer, Morgan De Dapper. *Precision Change Detection: Based on Knowledge-Based and Object-Oriented Satellite Image Analysis in Central Zimbabwe*. ASPRS 2006 Annual Conference, Reno, Nevada, May 1-5, 2006.

Argialas Demetre and Angelos Tzotsos. *Automatic Extraction of Physiographic Features and Alluvial Fans in Nevada, USA From Digital Elevation Models and Satellite Imagery Through Multiresolution Segmentation and Object-Oriented Classification*. ASPRS 2006 Annual Conference, Reno, Nevada, May 1-5, 2006.

Colin N. Brooks, David L. Schaub, Richard B. Powell, Nancy H.F. French, Robert A. Shuchman. Environmental & Emerging Technologies Division, Altarum Institute 3520 Green Court, Suite 300, Ann Arbor, MI 48105. ASPRS 2006 Annual Conference, Reno, Nevada, May 1-5, 2006.

* cited by examiner

FEATURE EXTRACTION USING PIXEL-LEVEL AND OBJECT-LEVEL ANALYSIS

CROSS-REFERENCE TO RELATED APPLICATIONS

This application claims the benefit of U.S. Provisional Patent Application No. 60/739,650 filed on Nov. 23, 2005, the contents of which are hereby incorporated by reference herein.

BACKGROUND OF THE INVENTION

1. The Field of the Invention

The present invention relates to image processing. More specifically, the present invention relates to detection and isolation of surface features in an image.

2. Related Technology

Image processing includes the application of processing techniques to the domain of images. Some concepts for processing an image are more often used in the realm of one dimensional image analysis, while other concepts for processing images may be more applicable in the realm of two or three dimensional image analysis. Traditional image processing can implement concepts such as image resolution, dynamic range, bandwidth, filtering, connectivity, rotational invariance, differential operators, edge detection, and domain modulation.

As processors become faster, analog image processing techniques are increasingly being replaced by digital image processing techniques. Digital image processing techniques are characterized by versatility, reliability, accuracy, and ease of implementation. Digital imagery can be stored in various formats as geospatial data. Typically, a captured digital image begins as a raster image. A raster image is a data file or structure representing a generally rectangular grid of pixels, or points of color or intensity, on a computer monitor, paper, or other display device. Each pixel of the image is characterized by an attribute, such as color. The color, for example, of each pixel can be individually defined. Images in the RGB color space, for instance, often consist of colored pixels defined by three bytes, one byte each for red, green and blue. Less colorful images require less information per pixel. An image with only black and white pixels requires only a single bit for each pixel.

Another type of digital geospatial data is vector data. Vector data, or geometric modeling, is the use of geometrical primitives such as points, lines, curves, and polygons to represent objects. Vector data specifies a visual representation of the data with minimal information, and as a result files consisting of vector representations are much smaller than files consisting of raster data. Also, because the parameters of vector objects are stored and can be later modified by operations such as moving, scaling, rotating and filling, the operations do not degrade the quality of a drawing as compared to raster graphics.

One area where digital image processing techniques have become of increased importance is in the area of automated feature extraction, which may include algorithms that use cues to detect and isolate various areas of the geospatial data. These algorithms may be used to extract features from the geospatial data, such as roads, railways, and water bodies, for example, that can be displayed on maps or in a Geographic Information System (GIS). A GIS user, a cartographer, or other person can then view the results displayed in the map or a rendered view of the GIS. Currently, however, only single levels of feature extraction are conducted, and although several methods and concepts exist for extraction of features from geospatial data, there is still a need for improved automated feature extraction.

BRIEF SUMMARY OF EXAMPLE EMBODIMENTS

The present invention relates to image processing. In one example, a method for extracting information from an image is disclosed. The method includes performing a pixel-level cue algorithm on a digital raster image. The method further includes converting at least a portion of the raster image to a digital vector layer. The method further includes performing an object-level cue algorithm on the digital vector layer. The method further includes identifying a feature using a result of the pixel-level cue algorithm and a result of the object-level cue algorithm performed.

In a graphical information system (GIS), a method for processing a digital image to locate a feature in the digital image is disclosed. The method including executing a pixel-level cue algorithm to identify an interesting area of a raster image. The method further including determining a pixel-level probability that the interesting area of the raster image identified is the feature using a result from the pixel-level cue algorithm. The method further including comparing the pixel-level probability to a pixel-level cue threshold. If the pixel-level probability satisfies the pixel-level cue threshold, the method includes converting at least a portion of the raster image to a vector layer, executing an object-level cue algorithm on the vector layer to identify an interesting area of the vector layer, determining an object-level probability that the interesting area of the vector layer is the feature using a result of the pixel-level cue algorithm, and comparing the object-level probability to an object-level threshold.

A feature template data structure in a computer readable medium is disclosed. The feature template includes a plurality of data fields. The date fields include a first data field containing data representing a pixel-level cue functioning to describe a pixel-level cue of the feature. The feature template further includes a second data field containing data representing an object-level cue functioning to describe an object-level cue of the feature.

In a computing system, one or more computer-readable media including computer-executable instructions for implementing a method of extracting information from an image is disclosed. The computer executable instructions, when executed by a processor, cause the computing system to perform several acts. The computer executable instructions, when executed by a processor, cause the computing system to perform a pixel-level cue algorithm on a digital raster image. The computer executable instructions, when executed by a processor, further cause the computing system to convert at least a portion of the raster image to a digital vector layer. The computer executable instructions, when executed by a processor, further cause the computing system to perform an object-level cue algorithm on the digital vector layer or a relation-level cue algorithm on the digital vector layer. The computer executable instructions, when executed by a processor, further cause the computing system to identify a feature using a result of the pixel-level cue algorithm and either: a result from the object-level cue algorithm or a result from the relation-level cue algorithm performed.

These and other aspects of the present invention will become more fully apparent from the following description and appended claims.

BRIEF DESCRIPTION OF THE DRAWINGS

To further clarify the above and other aspects of the present invention, a more particular description of the invention will be rendered by reference to specific embodiments thereof which are illustrated in the appended drawings. It is appreciated that these drawings depict only example embodiments of the invention and are therefore not to be considered limiting of its scope. The invention will be described and explained with additional specificity and detail through the use of the accompanying drawings in which:

FIG. 2 illustrates a multispectral image of several airplanes along with various other features and terrain within the image;

FIG. 3 illustrates a pixel probability layer output created by a first level of pixel-level analysis to isolate interesting pixels within the digital image of FIG. 2;

FIG. 4 illustrates a raster object layer output created by additional pixel-level analysis to isolate raster objects within the digital pixel probability layer of FIG. 3.

FIG. 5 illustrates an example of a raster object layer output after additional pixel-level analysis of the raster object layer illustrated in FIG. 4;

FIG. 6 illustrates a vector object layer output after a raster-to-vector conversion operation on the raster object layer illustrated in FIG. 5;

FIG. 7 illustrates an example of a vector object layer output after a additional vector object-level analysis of the vector object layer illustrated in FIG. 6;

FIG. 8 illustrates an object-level template used for a Template Matching cue in an Object Inference Engine;

FIG. 9 illustrates a vector object layer output from the Object Inference Engine;

FIG. 10 illustrates an attribute table for the vector object layer of FIG. 9;

FIG. 11 illustrates a vector object layer where the object-level cue has identified the areas with the best match corresponding to the airplanes and has eliminated other geospatial data which has not met pixel-level and object-level probability thresholds;

FIG. 12 illustrates an attribute table for the vector object layer of FIG. 11;

FIG. 13 illustrates the image of FIG. 2 along with vector objects corresponding to the extracted features superimposed over the original image;

DETAILED DESCRIPTION OF EXAMPLE EMBODIMENTS

Generally speaking, the feature-extraction system according to the preferred embodiment analyzes an image and automatically recognizes predetermined features of interest within the image. For example, an aerial or satellite image of a scene including aircraft of a particular type can be input to the feature-extraction system, and the system will automatically highlight portions of the image that are likely to be the aircraft.

For a computer to automatically recognize features that are generally easily recognized by humans, human-comprehensible cues must be converted to digital information that a computer can process. Humans use various cues for manual feature identification in images, such as color/tone, texture, size, shape, shadow, site/situation, pattern, and association. To employ these cues, as well as many others, in an automated feature-extraction system the cues must first be quantifiable, using cue algorithms that yield cue metrics, which are digital data consisting of measurements appropriate to the metric. Cues according to the preferred embodiment are divided into distinct categories, such as pixel cues, object cues, and relation cues. Pixel cues are dimensionless, i.e. measurable as pixel values. Object cues measure properties of one dimensional lines or two dimensional polygons. Relation cues measure objects' distributional patterns within a feature class or a feature's spatial association with other features.

In order for a system to exploit several, if not all, of the human interpretation cues, the system according to the preferred embodiment has machine learning components (also called inference engines) capable of learning cues and querying for cues. Additionally, the process can provide the capability to transition information including different bases, such as between pixel cues and object cues, in order for these cues to work together in a single system.

Figure 1:
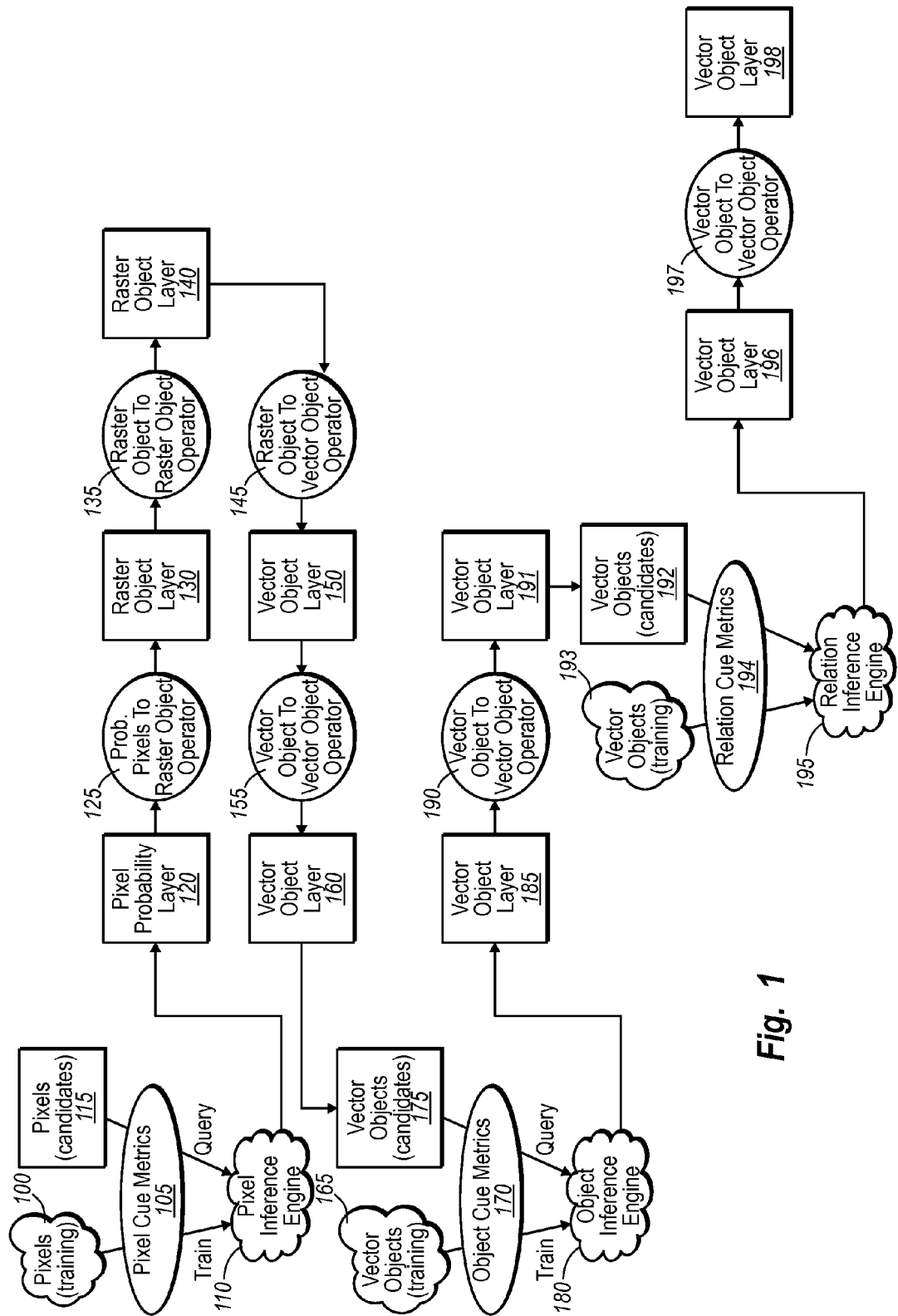
FIG. 1 illustrates a process flow of an example design focusing on pixel and object-level cue algorithms.

FIG. 1 illustrates a generic process flow of an example design. To fully explain the preferred embodiment, the entire process of FIG. 1 is explained; however, a user may start the process anywhere and end the process anywhere. A concrete example illustrating the generic process of FIG. 1 is illustrated by FIGS. 2-13.

As shown in FIG. 1, a user begins with either one or more training pixels or candidate pixels. (Training pixels are used to establish the parameters of the metrics that are relevant to finding the features of interest, while candidate pixels may contain features of interest that the user wishes to find using an automated feature-extraction system.) Typically, a user inputs training pixels by selecting a block of pixels, such as the pixels inside of a user-drawn polygon, on which cue algorithms that computes Pixel Cue Metrics 105 should be run. Candidate pixels are typically input without supervision; in that case, an entire image is input and the cue algorithms process the entire image. There are thousands of well-known pixel-cue algorithms, which quantify cues based on information available in pixels.

The pixel cues are non-dimensional, per-pixel calculations. Examples of pixel cues include human-visible cues such as color/tone, texture and site/situation, and human-imperceptible cues that require other image operations performed in the raster domain and that can go beyond human visual ability by processing information that is visually undetectable, such as vegetative indices, spectral transforms and others. The cue algorithms convert these cues into cue metrics 105, which include the color/tone spectral value (which is a DN), multivariant discriminators (e.g. maximum likelihood, mahalanobis distance, euclidean distance), hyperspectral discriminators (e.g. Orthogonal Subspace Projection (OSP), Constrained Energy Minimization (CEM), Spectral Angle Mapper (SAM), Spectral Correlation Mapper (SCM), etc.), indices (e.g. Normalized Difference Vegetation Index (NDVI), etc.), spectral transforms (e.g. Principal Component Analysis (PCA), Intensity/Hue/Saturation (IHS), etc.), and/or texture (i.e. a measurement of smoothness/roughness).

Texture involves neighborhoods or blocks of pixels but is still measured in the raster domain, and thus is referred to herein as a pixel cue or cue metric. Examples of texture pixel-cue metrics include variance, skewness, entropy, fractal, and others that can include multiple scales (i.e., window sizes). Site includes all other ancillary geospatial data layers which may contribute to a feature such as Digital Elevation Model (DEM), slope, aspect, land cover, soils, and other thematic GIS layers.

Given the diversity of quantity of cues, and to make the system adaptable to different feature types, these pixel-cue algorithms can be implemented as plug-ins (such as DLLs). The particular plug-ins are preferably selected by expert users which the user may use to create an analyst system that has been trained for particular applications, as will be discussed in more detail below. Plug-ins are, however, not necessary in any of the embodiments disclosed herein, and a static architecture can be used without plug-ins or DLLs.

As mentioned previously, the training pixels 100 are typically identified by a user, for example an expert user, by selecting a set of pixels representing an interesting feature (generally discovered manually) with user-selected polygons in an image. If the expert user has explicit prior knowledge of the expected result of the cue metric's distribution it can be specified directly and not learned through training. Such explicit distribution-making probably occurs primarily with object-cue metrics, which are described in more detail below, but it can also arise with respect to pixel cues. For example, where a user knows that a certain tree most favorably grows at a certain elevation, the user can directly specify that elevation as a mean of a Gaussian distribution and set a standard deviation to account for variability about that mean elevation. The output of the cue algorithm, in this case Pixel Cue Metrics 105, is an input to a Pixel Inference Engine 110, as shown in FIG. 1.

The Pixel Inference Engine 110 takes, for example, several pixel cue metrics as an input and evaluates the pixel cue metrics to determine whether any pixels compose a feature of interest. The Pixel Inference Engine 110 will behave slightly differently depending on whether the input pixels were training or candidate pixels. If training pixels, the Pixel Inference Engine 110 will operate interactively with the user to acquire knowledge based on the training pixels and/or the user-specified distributions. If the input pixels are candidate pixels, the Pixel Inference Engine will apply the "knowledge" the user imparted to it during an earlier training phase. (More precisely, the Pixel Inference Engine 110 measures how closely the candidate pixels 115 resemble the training pixels 100). The example discussed in more detail below with reference to FIGS. 2-13 provides additional detail.

To make the system adaptable to different applications, as well as to compare the performance of different machine learning algorithms, the pixel inference engine 110 can be implemented as a plug-in, such as a DLL. The Pixel Inference Engine 110 can also be used to compare performance of the different pixel cue algorithms, which are also preferably plug-ins. In other words, a user, probably an expert user, when choosing cue algorithm plug-ins, can try different combinations of cue algorithms on candidate pixels; the Pixel Inference Engine 110 will process the outputs of the different cue algorithms so that the expert user can decide which combination of cue algorithms yields the best results under various conditions.

The Pixel Inference Engine 110 preferably can process both continuous and discrete inputs (for example, probability distributions and binary inputs), learn from training samples, and return a query metric for candidate pixels 115 indicating a goodness of match to the training pixels 100. Examples of suitable machine learning algorithms include Bayesian Networks (BNs), Classification and Regression Trees (CARTs), and Neural Networks (NNs).

The output of the Pixel Inference Engine 110 is a Pixel Probability Layer 120 in which each pixel's value represents the probability that it is the feature of interest. The Pixel Probability Layer becomes the starting point for several optional operators that perform in the raster domain, convert to the vector domain, and/or operate in the vector domain. Specialized versions of these operators translate the information in the Pixel Probability Layer 120 into vector objects that are suitable for the object cue algorithms and object machine learning.

A Probability Pixels to Raster Objects Operator 125 converts the Pixel Probability Layer 120 into a Raster Object Layer 130, which contains pixels that are grouped as raster objects. To make the system adaptable to different feature types these operators can also be implemented as plug-ins (DLLs). Selection of plug-ins can be conducted by experts using, for example, expert versions of the system to create analyst versions of the system tailored to a particular application.

The Probability Pixels to Raster Objects Operator 125 can be any number of well-known image-processing operators, but some examples include Threshold/Clump, which typically includes a Threshold operation on the Pixel Probability Layer 120 with a scalar to a true/false binary image and then a run of the Clump to form the Raster Object Layer 130. (The threshold value can be a scalar, for example, which determines which pixels are considered the feature of interest.)

Another example of a Probability Pixels to Raster Objects Operator 125 includes Region Growing using a direct region growing operator from a maximum in the Pixel Probability Layer 120. Region Growing can be combined with edge-detection as well. Learned object cue metrics can also be used as an aid in controlling a region growing operation. Again, any number and combination of operators may be implemented and use of clump, threshold, and region growing are used by way of example only.

Whatever the operator, the result should be a raster object layer consisting of raster objects. A raster object, as one of ordinary skill knows, is a collection of pixels that touch each other (e.g. using a 4 or 8 neighbor rule) and are distinct from other raster objects. The pixels in these raster objects can share and be identified by a common class ID.

An attribute table data structure can be generated summarizing various information describing each class ID. For each raster object, the zonal mean probability from the Pixel Probability Layer 120 can be computed and stored as an attribute that can also be included in the attribute table. As known by one of ordinary skill, zonal operators are a class of operators that work on thematic raster classes, or in this case, raster objects. The zonal mean probability is the mean probability of all the probability pixels corresponding to (or under) a raster object. This can be the starting probability value for an interesting area designed by a class ID.

The Raster Object Layer 130 is then, optionally, input to a Raster Object to Raster Object Operator 135, which takes the Raster Object Layer 130 from the previous operation and performs mathematical morphology on the objects in the raster domain. The Raster Object To Raster Object Operator 135 can be 0-N operators; that is, a list of operators. For example, a size filter can be used first, and then a morphological operator, followed by a splitting operator to determine if a raster object is composed of two objects. Size filters typically filter out objects fewer than a certain count of pixels and morphological operators trim boundaries.

Other examples of an Raster Object to Raster Object Operator 135 include erode operators (removes 8 connected pixels from the edge of the object), dilate operators (adds 8 connected pixels to the edge of the object), open (erode then dilate), close (dilate then erode), skeleton operators (reduce a polygon to a skeleton), thin (thin a linear object to a single line of 8 connected pixels), split operators (split object into two objects using erosion), and join operators (add two objects together using dilation). To make the system adaptable to different feature types any of these operators can be implemented as plug-ins (DLLs).

The output of Raster Object to Raster Object Operator 135 is a new Raster Object Layer 140, which contains pixels that are grouped as raster objects that have associated attributes. The Raster Object Layer 140 is preferably input to a Raster Object To Vector Object Operator 145, which is one of a class of operators that converts objects from the raster domain to the vector domain to produce a Vector Object Layer 150 consisting of objects comprising polygons and polylines. Two example operators include Moore Contour Tracing (which makes a polygon coordinate from the centroid of each pixel on the boundary of the raster object) and IMAGINE Contour Tracing (which traces the outside edge of the boundary pixels and cuts corners where necessary), the latter being available as part of ERDAS IMAGINE, available from Leica Geosystems Geospatial Imaging, LLC of Norcross, Ga. To make the system adaptable to different feature types this Raster Object To Vector Object Operator 145 can also be implemented as a plug-in (such as a DLL).

The Vector Object Layer 150 preferably contains the vector objects in a layer, such as an ESRI Shapefile. (ESRI is located in Redlands, Calif.) Each vector object also preferably includes an attribute representing the pixel-level probability associated with the raster object from which it is formed.

A Vector Object To Vector Object Operator 155 operates on the input Vector Object Layer 150, performs operations on the vector objects, and produces a new Vector Object Layer 160. These operations may be necessary to change the shape of the vector objects by generalizing, smoothing or other processes. This operator is an optional addition to the automated feature-extraction system according to the preferred embodiment, and may also be chained in sequence with other operators in the object or vector domain. To make the system adaptable to different feature types, these operators can also be implemented as plug-ins (such as DLLs) as discussed above, and different versions of the system can include different plug-ins for different applications. An example of a Vector Object To Vector Object Operator 155 includes the generalize operator, which typically reduces the noise and pixel artifacts in a polygon or polyline.

At this point, before discussing the Object Inference Engine 180, it is convenient to describe the dependence on whether the user is setting up the system, as an expert user might do, or merely using the system set up by an expert to perform automated feature extraction on an image or set of images. An expert user, during the course of training the inference engines, may wish to run the training pixels through all of the various operators (such as one or more of Probability Pixels to Raster Objects Operator 125, Raster Object to Raster Object Operator 135, Raster Object To Vector Object Operator 145, or Vector Object To Vector Object Operator 155) that he has chosen in order to test the particular operators he chose. Yet all of these steps are unnecessary strictly for training the inference engines. Therefore, if he chose, an expert user can train the inference engines independently of choosing the particular operators that best suit the automatic-feature-extraction task at hand.

That having been said, an expert user has two common options for introducing data to an object inference engine through an object cue algorithm: inputting training vector objects and inputting Vector Object Candidates 175 that compose the Vector Object Layer 160. (A third option that may be less common than these two is to input a candidate object file, such as an ESRI shapefile, without having gone through the process of inputting pixel imagery.) That is, either of the Training Vector Objects 165 or the Vector Object Candidates 175 shown in FIG. 1 may have originally been raster objects converted to vector objects via a Raster Object To Vector Object Operator 145, for example, or they may have originally been vector objects residing in a vector layer file, such as an ESRI shapefile, where the vector layer file exists independently of a raster image.

These Training Vector Objects 165 can also be identified by a user with explicit prior knowledge. For example, the user can specifically enter a size of an aircraft, for example fifty (50) square meters. One difference between pixel training and object training is that with object training the data can be sparse, i.e. too few samples of data to learn from. For this reason, object training can be specified with distribution parameters such as a Gaussian distribution, which is specified as a mean and standard deviation.

As with the previously discussed pixel cue algorithm, a vector cue algorithm generates Object Cue Metrics 170 that can be input to an Object Inference Engine 180 which takes, for example, several such Object Cue Metrics 170 (which are themselves the output of the vector cue algorithms) as an input and evaluates the Object Cue Metrics 170 to determine whether any object represents a feature of interest. As previously mentioned, cue algorithms can quantify human visual cues by computing cue metrics. Example Object Cue Metrics 170 include Shape/Size/Orientation (although a large number of cues can describe shape attributes), arbitrary template matching, right angles, orthogonality, area, perimeter, area/perimeter, length, width, length/width, boundary complexity, rectangular fit, elliptical fit, compactness, symmetry, orientation, shadow (can be inferred if sun geometry is known, otherwise it can be learned), direction, background (information surrounding the object), spectral information of surrounding pixels, textural information of surrounding pixels, extent (how far out from a feature to consider), other zonal (e.g., from a computation of a zonal attribute from other imagery), zonal mean, zonal texture, and zonal site variables. To make the system adaptable to different feature types these cues can be implemented as plug-ins (such as DLLs), as discussed above.

The Object Inference Engine 180 will behave slightly differently depending on whether the input vector objects were training or candidate vector objects. If training objects, the Object Inference Engine 180 will operate interactively with the user to acquire knowledge of the object's cue metric results. If the input objects are Vector Object Candidates 175, the Object Inference Engine 180 will apply the "knowledge" the user taught it during an earlier training phase. More precisely, the Object Inference Engine 180 measures how closely the Vector Object Candidates 175 resemble the Training Vector Objects 165. Preferably, the result of this measure or comparison is stored as an attribute of the vector object, which, among other things, helps evaluate the Object Cue Metrics' 170 distribution properties and the Object Inference Engine's 180 performance.

The Object Inference Engine 180 can be implemented as a plug-in (such as a DLL) selected, for example by an expert user, for a particular application. It is not required that the implementation of the Object Inference Engine 180 (e.g., CART, BayesNet, Neural Network, etc.) be the same as the Pixel Inference Engine 110. They may each use different implementations.

The Object Inference Engine 180 generates a Vector Object Layer 185 that may contain the same vector objects as the input to the Object Inference Engine 180 (and, as previously mentioned, the input may be the Vector Object Layer 160 or a vector file). In that case, the results (otherwise described as query results or probability metrics) generated by the Object Inference Engine 180 preferably populate the attributes of the various objects within Vector Object Layer 185.

Vector Object To Vector Object Operator 190 includes classes of operators that can be performed on the Vector Object Layer 185 and, for example, are intended for probability thresholding and for clean up of the object polygon or polyline footprint. To make the system adaptable to different feature types these operators can also be implemented as plug-ins (such as DLLs). An example implementation may include one or more of an arbitrary template transform operator that transforms a template of an object to the image space with the correct scale, rotation, and x,y position (which can be used for discrete targets), or an orthogonality operator that adjusts an object's polygon to consist of all straight lines and right angles (e.g., to render an object more realistically for buildings). These are just two examples of a Vector Object To Vector Object Operator 190. There can be many others. In addition, rather than being a single operator, the Vector Object To Vector Object Operator 190 can be a list of Vector Object to Vector Object operators.

A Vector Object Layer 191 is output from the Vector Object To Vector Object Operator 190 and contains the vector objects in a layer. This can be the final result of a process where relational metrics are not employed. Attribute tables or other outputs can be generated describing the identified objects and probability indices indicating a probability that the objects are the features of interest. Along with the vector objects, the different probability metrics and cue algorithm metrics used in the process can also be stored in computer accessible memory as data structures.

If relation cues are to be employed, Training Vector Objects 193 or Vector Object Candidates 192 are input to a relation cue algorithm to generate Relation Cue Metrics 194, as with the pixel and vector object cue algorithms. That is, either of the Training Vector Objects 193 or the Vector Object Candidates 192 shown in FIG. 1 may have originally been vector objects composing the vector object layer 191, for example, or they may have originally been vector objects residing in a vector layer file, such as an ESRI shapefile, that never has been manipulated by an earlier process shown in FIG. 1. In addition, a user, such as an expert user, can specifically enter a known relation or pattern between vector objects.

As previously mentioned, cue algorithms can quantify human visual cues by computing cue metrics. Relation cues measure objects' distributional patterns within a feature class or a feature's spatial association with other features. Example relation-level cue algorithms compute pattern and association cue metrics.

The Relation Inference Engine 195 is the machine learning component for learning and querying the relation cue metrics 194 for relation-level properties. The Relation Inference Engine 195 queries the relation cue metrics 194 to measure how closely they resemble the training objects 193 (or fit the parametric distributions specified by an expert user). The query result for an object can be recorded as an object attribute to help evaluate the Relation Cue Metrics' 194 distribution properties and the Relation Inference Engine's 195 performance. When the query result for each object is recorded as an object attribute, a Vector Object Layer 196 (which is the result of the Relation Inference Engine 195) contains the same vector objects as the input layer 191 to the Relation Inference Engine 195 query.

As with the other inference engines, the Relation Inference Engine 195 can be implemented as a plug-in (such as a DLL) selected for a particular application. Moreover, the Relation Inference Engine 195 need not be the same type (e.g., neural network) as the Pixel Inference Engine 110 or the Object Inference Engine 180.

Vector Object To Vector Object Operator 197, which, as with the other operators, is optional, includes classes of operators that can be performed on the Vector Object Layer 196 and may be used for probability thresholding and for clean up of the object polygon or polyline footprint. To make the system adaptable to different feature types these operators can also be implemented as plug-ins (such as DLLs).

A Vector Object Layer 198 is output from the Vector Object To Vector Object Operator 197 and contains the vector objects in a layer. This can be the final result of a process where relational metrics are employed along with pixel cues and object cues. Attribute tables or other outputs can be generated describing the identified objects and probability indices indicating a probability that the objects are the features of interest. Along with the vector objects, the different probability metrics and cue algorithm metrics used in the process can also be stored in computer accessible memory to create feature model data structures.

As is apparent from the above description, an aspect of the preferred embodiment is the ability to track a feature's probability through the entire process. As was described, a pixel's probability from the pixel inference engine can be written to the corresponding raster objects' attribute table. Then the pixel's probability can be copied to the vector object's attributes as well. This same raster-domain probability can be used in the calculation of the final probability that an object is the feature of interest. Thus, any number of the probability values, or all of the probability values determined in the method illustrated in FIG. 1, can be used in the final algorithm to identify the feature of interest.

Having described the general automated feature-extraction system and process with reference to FIG. 1, example processes for processing a digital image to locate at least one feature in the digital image will be illustrated with cross-reference to FIGS. 2-13, which represent various stages in examples of the process illustrated in FIG. 1. For the illustration, we seek ultimately to automatically detect aircraft in imagery.

Figure 2:
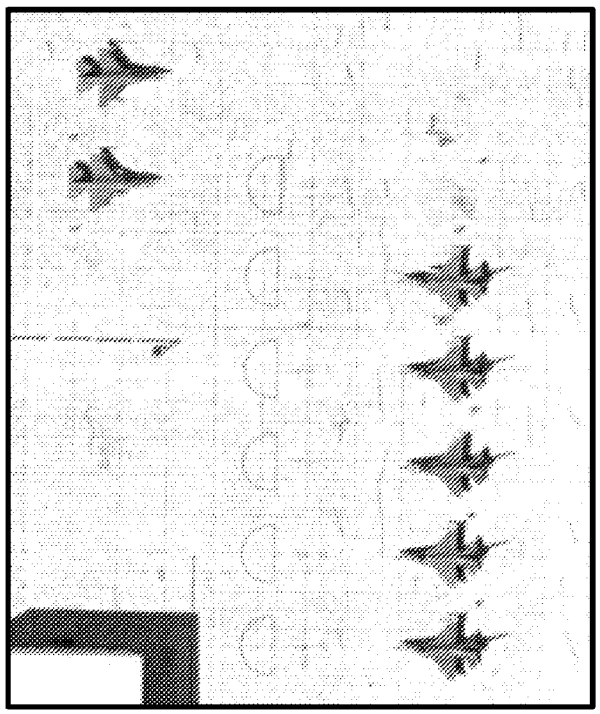
FIGS. 2-13 illustrate a process flow of an example design focusing on pixel and object-level cue algorithms.

In the illustration, the first step is to train the pixel inference engine, which requires first identifying pixel cues and pixel cue algorithms. As shown in FIG. 2, which shows a multi-spectral image of a scene including several airplanes along with various other features and terrain within the image, it appears that a salient pixel cue is tone: the airplanes appear to be characterized by a pixel cue metric consisting of a specific grayish tone. To develop a pixel cue metric that can be processed by the pixel inference engine, an expert user selects pixels that are indicative of an airplane. The expert user can then run the pixel inference engine and view the output to determine if the inference engine is operating as desired.

Next, the expert user identifies object cues and selects cue algorithms to establish object cue metrics and, optionally, relation cue metrics. These metrics, generally in contrast to pixel cue metrics, tend to be established using rules or explicit expert knowledge, rather than samples of imagery (such as samples of pixels). Similarly to the process of training the pixel inference engine, the expert user in this example runs each of the object inference engine and the relation inference engine to evaluate its performance. If the performance is undesirable, he may change the cue algorithms or the inference engine.

Incidentally, it should be noted that variations in this example are possible; the example is only explained to provide additional understanding to those not well-versed in pattern recognition technology.

Suppose now that the expert user has trained the pixel inference engine and that the image of FIG. 2 represents an example of candidate pixels 115 of FIG. 1. The image of FIG. 2 is first processed using pixel cue metrics. For example, the image of FIG. 2 can be processed for spectral differences between different pixels and their relative spectral level. In this instance, bright grey-tone (i.e. near white) can mean that the pixel has a low probability that the individual pixel is a pixel of an airplane, while darker pixels are suggestive of a higher probability that the pixel belongs to a representation of an airplane.

It should be appreciated that the use of grey-tone scale or color to indicate probability in raster or vector layers is by way of example. Different and additional visual cues used to represent probability attributes for raster and/or vector objects can be used, such as spectral, textural and site cues as described above, alone or in combination.

For this example of FIGS. 2-13, a Bayesian Network embodies the Pixel Inference Engine 110 shown in FIG. 1. The Bayesian Network processes the pixel cue metrics (which in this example consist only of a tone metric) to generate a pixel probability layer in which each pixel has an associated probability that it fits the pixel cue metrics (and in this example a single metric, tone is evaluated).

Figure 3:
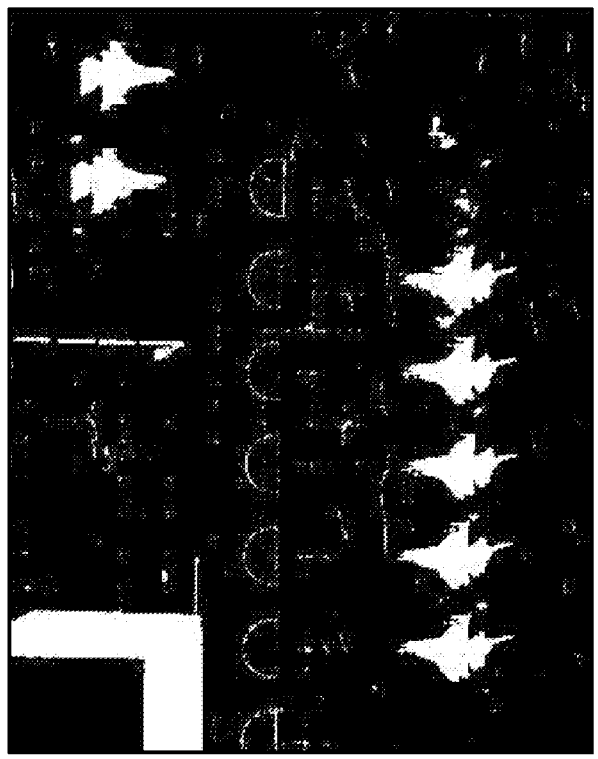
Figure 4:
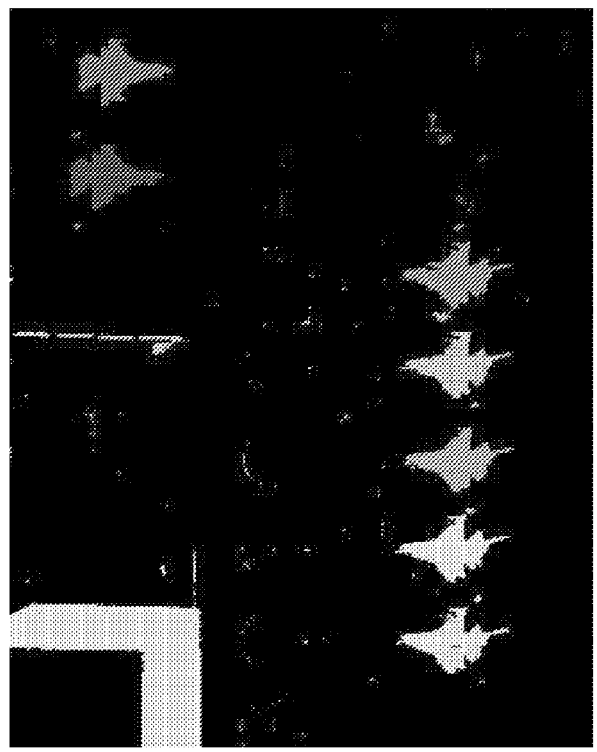
Figure 5:
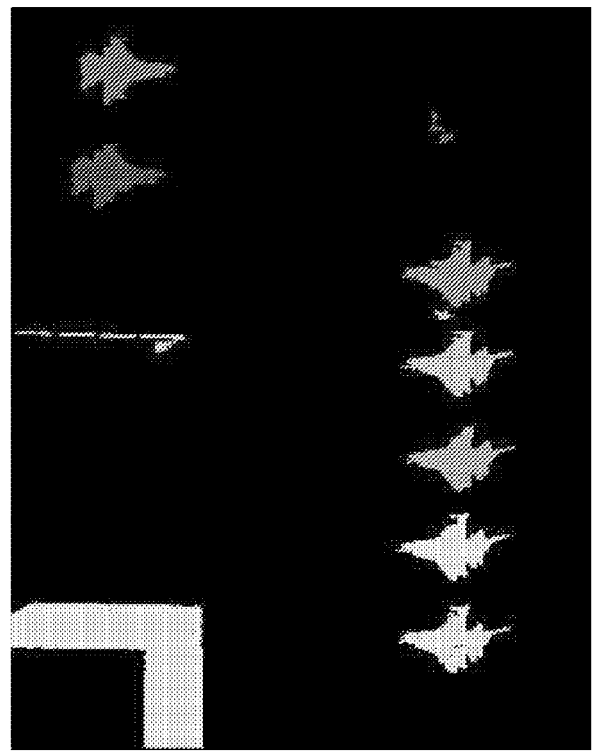

Then, a Probability Pixels to Raster Objects Operator 125, such as a threshold and clump operator, thresholds out the pixels below a certain user-specified probability and then performs a contiguity analysis (clump) to form raster objects. FIG. 3 shows a layer illustrating the result of a thresholding operator. FIG. 4 shows the results of the clump operation after the thresholding, in which each color represents a different object. Clumping and thresholding need not, however, be separate operators, but can be functions performed by a single operator. As shown, the L-shaped feature in the lower left is one object, the somewhat malformed clump in the lower right that resembles a military jet is another object, and the jet-like clump above it is yet another object. The specs trailing off to the left in front of the jets are also each individual raster objects. Other examples of individual raster objects are apparent from the figure.

As shown in FIG. 4, groups of pixels that, to a human observer, are obviously not aircraft are grouped together as raster objects. To filter out some of the groups that are obviously not aircraft, raster objects below a certain size are filtered out using a pixel count thresholding operator. The result is the layer shown in FIG. 5.

Figure 6:
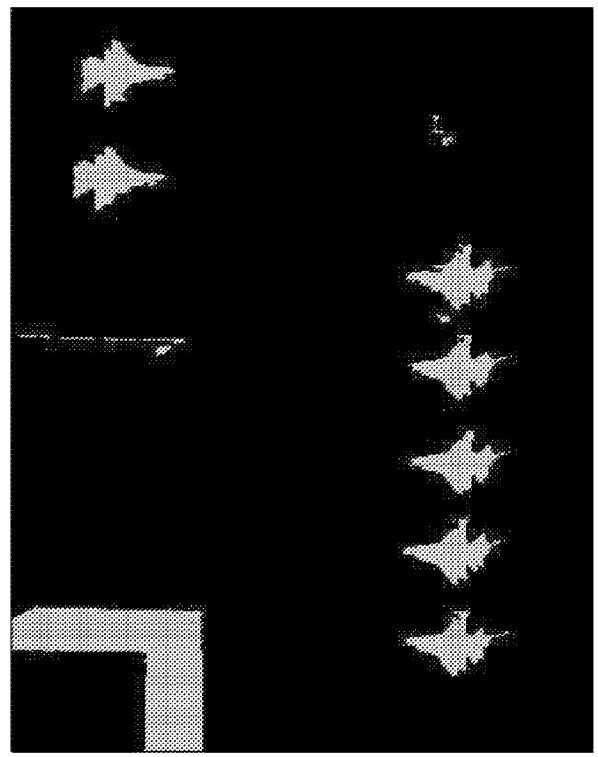
Figure 7:
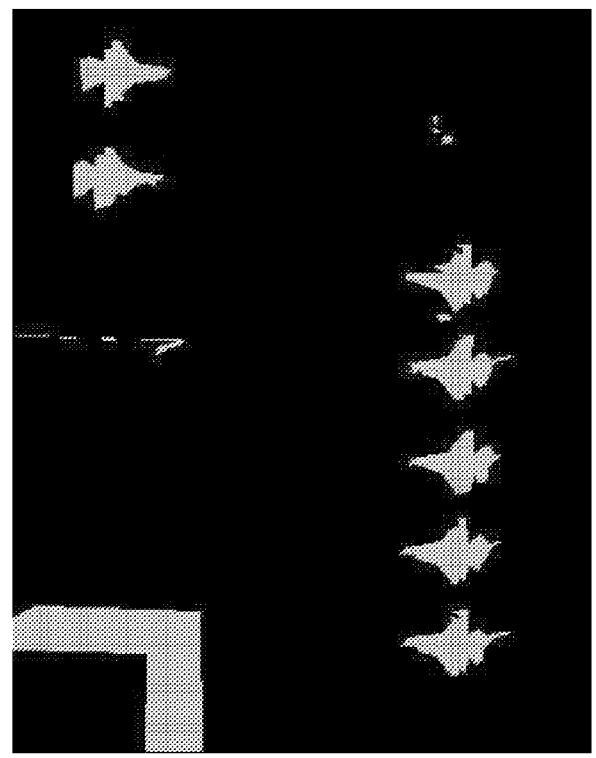

Additional operators are applied to the layers as determined by an expert user. FIG. 6 illustrates a vector object layer output after a Contour Trace operator is executed using the raster object layer illustrated in FIG. 5 as an input. FIG. 7 illustrates an example of a vector object layer output after a Generalize operator has been executed on the vector object layer illustrated in FIG. 6. Any number of operators in any order can be used to clean up or process the vector objects prior to the object inference engine.

Figure 8:
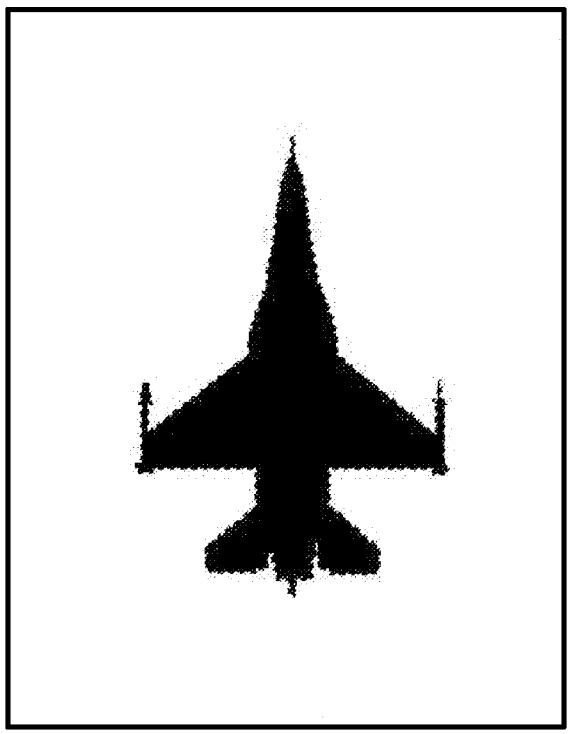

To use vector cues of a feature, an expert user must first identify object cue metrics that describe the feature of interest, choose object cue algorithms, and train the object inference engine. FIG. 8 illustrates an object-level template used in training the object inference engine. The template that may be described by such metrics as Shape, Shadow and Background. As with pixel cues, object cue algorithms quantify these qualitative cues to generate object cue metrics that can be processed by the object inference engine. The expert user trains the object inference engine using the template shown in FIG. 8.

After having been trained, the object inference engine can determine an object-level probability that the objects of a vector layer (that is, a candidate vector layer) are features of interest based on the results from both the object cue metrics and the probability results of the pixel inference engine (which in the example is a Bayesian Network). (Recall that the probability results of the pixel inference engine are stored as an attribute of the vector objects.)

Figure 9:
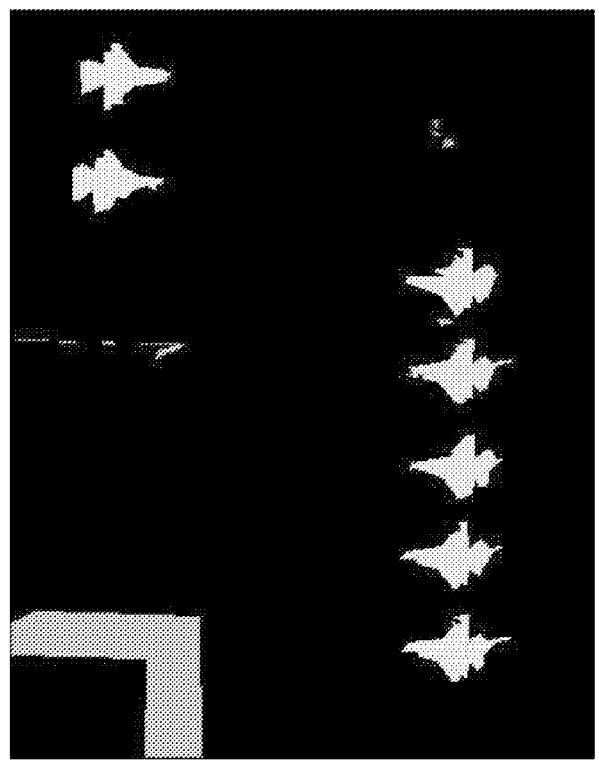

FIG. 9 illustrates a vector-object probability-layer output from the object inference engine. The yellow objects, which depict aircraft to a human observer, enjoy a high probability of being features of interest (which in this example are aircraft) while the L-shaped object in the lower left of the figure, shown in aqua, is associated with a low probability of being a feature of interest.

Figures 10, 11, 12:
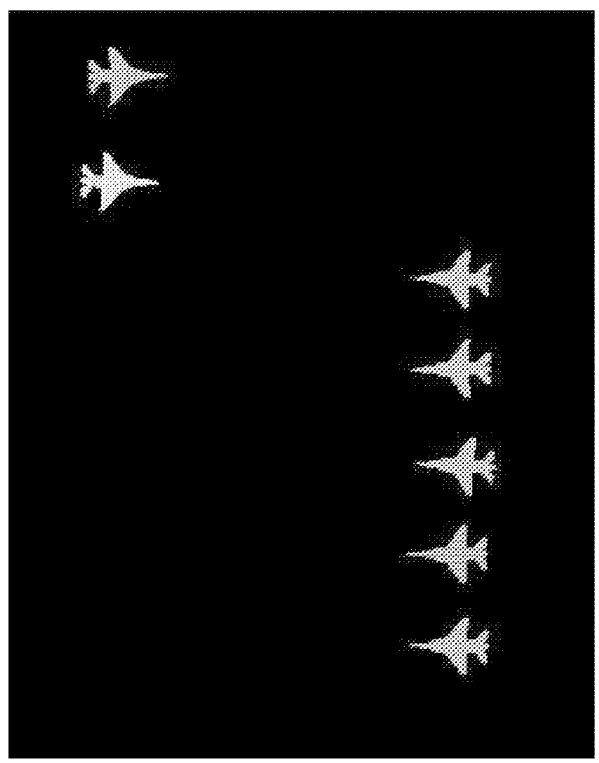

The object inference engine preferably also outputs an attribute table, as shown in FIG. 10. The table in this example includes the pixel probability, object cue metrics results (such as area, Axis1 Length, Axis2 Length and Template Match) and final probability for each object identified in FIG. 9. A thresholding operation removes objects that have a probability of being features of interest below the threshold, resulting in a vector layer shown in FIG. 11. An attribute table can again be generated and displayed along with the remaining objects under consideration including the result of the various inference engines, as shown in FIG. 12.

One of ordinary skill will appreciate that the system described in the foregoing example can be modified to introduce greater generality and automation. For example, in contrast to the foregoing example, in which the Pixel Inference Engine 110 and the Object Inference Engine 180 were each run linearly, not iteratively, to analyze cue metrics generated by cue algorithms that run on the data of an image (even a training image), the system may have the inference engines run on cue metrics iteratively. This probably is of greatest benefit to reduce the skill and specialization required of an expert user as he trains the system.

Since some cue algorithms and inference engines require operations to be performed before they can process certain metrics, the expert user wishing to iteratively run the inference engines must establish an order for the processes. For example, the expert user in the foregoing example may establish the following order: the color cue algorithm runs on the training pixels, then the pixel inference engine processes the color cue metrics of the pixels in the image (including their attributes), then the clump operation runs on the resultant raster layer, then the clump cue algorithm runs on the resultant raster object layer, then the pixel inference engine runs on the resultant objects (including their attributes), then the raster object to vector object operator runs on the raster objects, then the size cue algorithm runs on the resulting raster objects, then the shape cue algorithm (which may itself comprise several cue algorithms) runs on the resulting vector objects, and then the object inference engine runs on the resulting cue metrics for the objects. (Incidentally, each process runs on the data generated in the previous process.) The expert user preferably establishes default parameters (e.g., size median and standard deviation for the size metric) that the inference engines can update as they learn.

Figure 13:
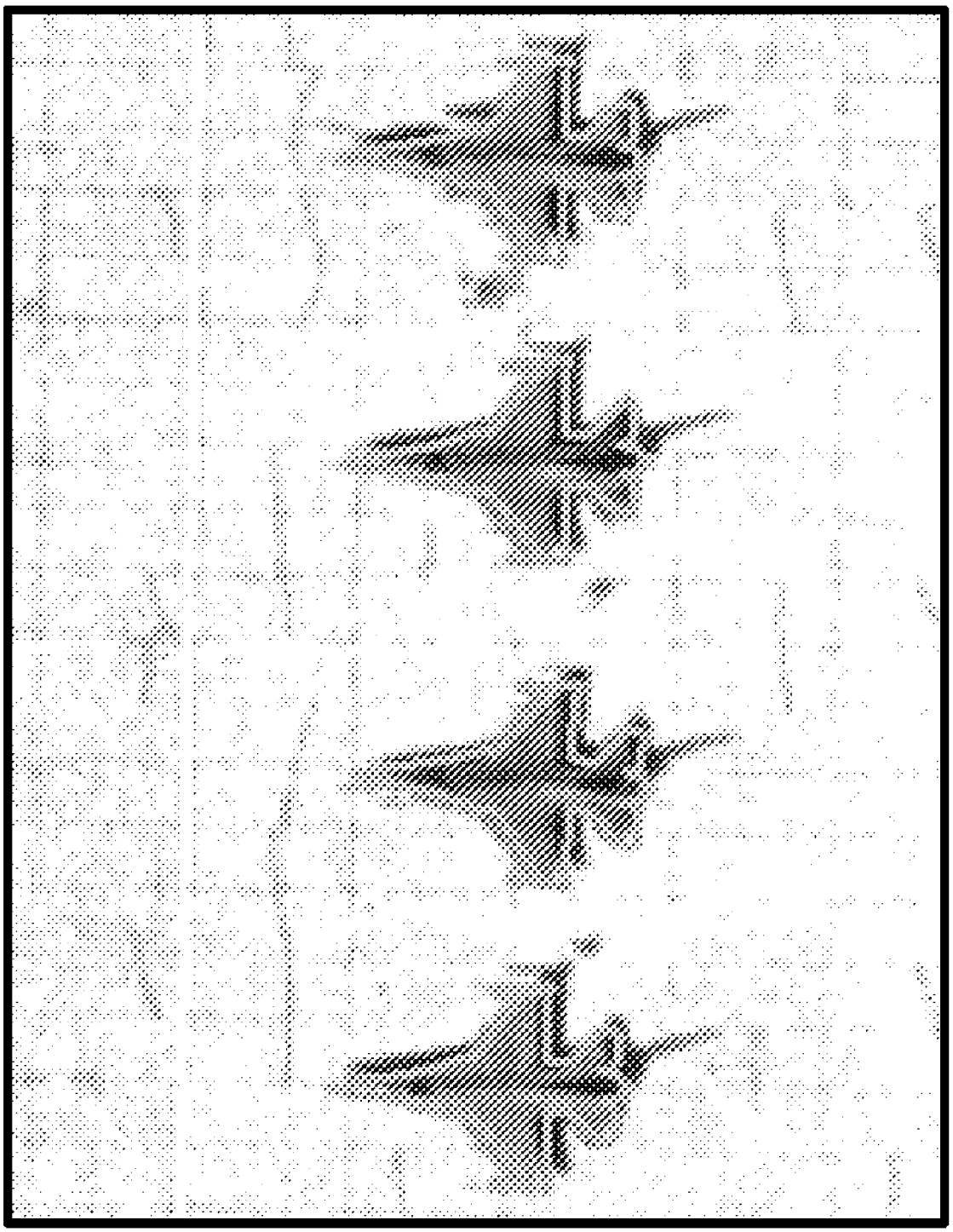

Returning now in the example to where we left off before the discussion of iteratively running inference engines, various Cleanup operators can improve the appearance of the visual representations of the data, or improve the usefulness of the data itself For example orthogonality (building square-up), template mapping, or other operations can be used. Referring to FIG. 13, the features, in this instance airplanes, have been extracted and a vector object is placed into its correction position (scale, offset, and rotation), by inversely mapping the aircraft template back into the image map space.

Though it is not used in this example, additional relation level cue algorithms may be implemented. For example, where a pattern or association regarding the features, in this instance airplanes, is known the features can be further extracted using these relation level cue algorithms.

At this point, it is convenient to discuss the manner in which an expert user transfers his knowledge to a less-expert user (or at least a user with different expertise), such as an analyst. To do that, we first discuss feature models and feature templates.

The feature template or feature model permits a division of labor between experts, who are knowledgeable about the feature of interest and automated extraction techniques, and analysts, who are knowledgeable about imagery. So, an analyst version of the system may include a basic framework into which feature templates or feature models can be loaded, or plugged in, using a single download or package of software libraries and data.

A feature model can be represented by a data structure that encapsulates a description of a feature. The data structure can include all cue metrics, including one or more of pixel cue metrics, object cue metrics and relation cue metrics, the inference engines that act on them, and the transitional operators, which transform one type of output to another and include operators 125, 135, etc. A user, such as an expert user, can specify a feature model, such as through a wizard, by specifying feature-of-interest attributes, a feature-of-interest template, and/or providing evidence, and also by choosing cue algorithms, inference engines and post-processing algorithms.

Alternatively, a feature template, in contrast to the feature model, may consist only of the framework for obtaining the evidence, not the evidence or evidence-derived information itself. So, the feature template can contain expert knowledge created by expert software and can be completely data independent, making it reusable for local data. The feature templates can be generated from practice of the methods illustrated in FIG. 1. For example, the feature templates can include information learned from results of the Cue Metrics 105, 170, and/or 194, which are saved as data structures in a computer readable medium. The feature models can also include the training pixels 100 and training vector objects 165 and 193.

A feature template data structure created, for example, by an expert can include all cue metrics, training samples, raster training samples and polygons. In this instance, vector training models can be bundled with the DLLs so that a non-expert analyst can run the automated feature extraction system correctly in a particular application. These feature template files (or file) can be at least partially bundled into one installation disk, or downloaded, to get the correct plug-ins (in the form of DLLs).

The expert-analyst environment can be implemented in an enterprise environment. Enterprise environments are a field of information technology focused on the management of data in large-scale environments. For example, an expert can train the software for a particular application creating analyst versions of the software having particular plug-ins selected by the expert and analyst users can use the analyst software versions to find features in imagery stored in the analysts local memory based on the training that the expert has done at a remote location in the enterprise environment. Thus, an analyst version of the software may not include every element of the method illustrated in FIG. 1. For example, the training pixels 100 may have already been entered by an expert using expert software to create the analyst version and thus are not produced by analysts according to these embodiments. These different versions can be operated and accessed using any type of distributed system where different users can be and processes are located locally or remotely.

Figure 14:
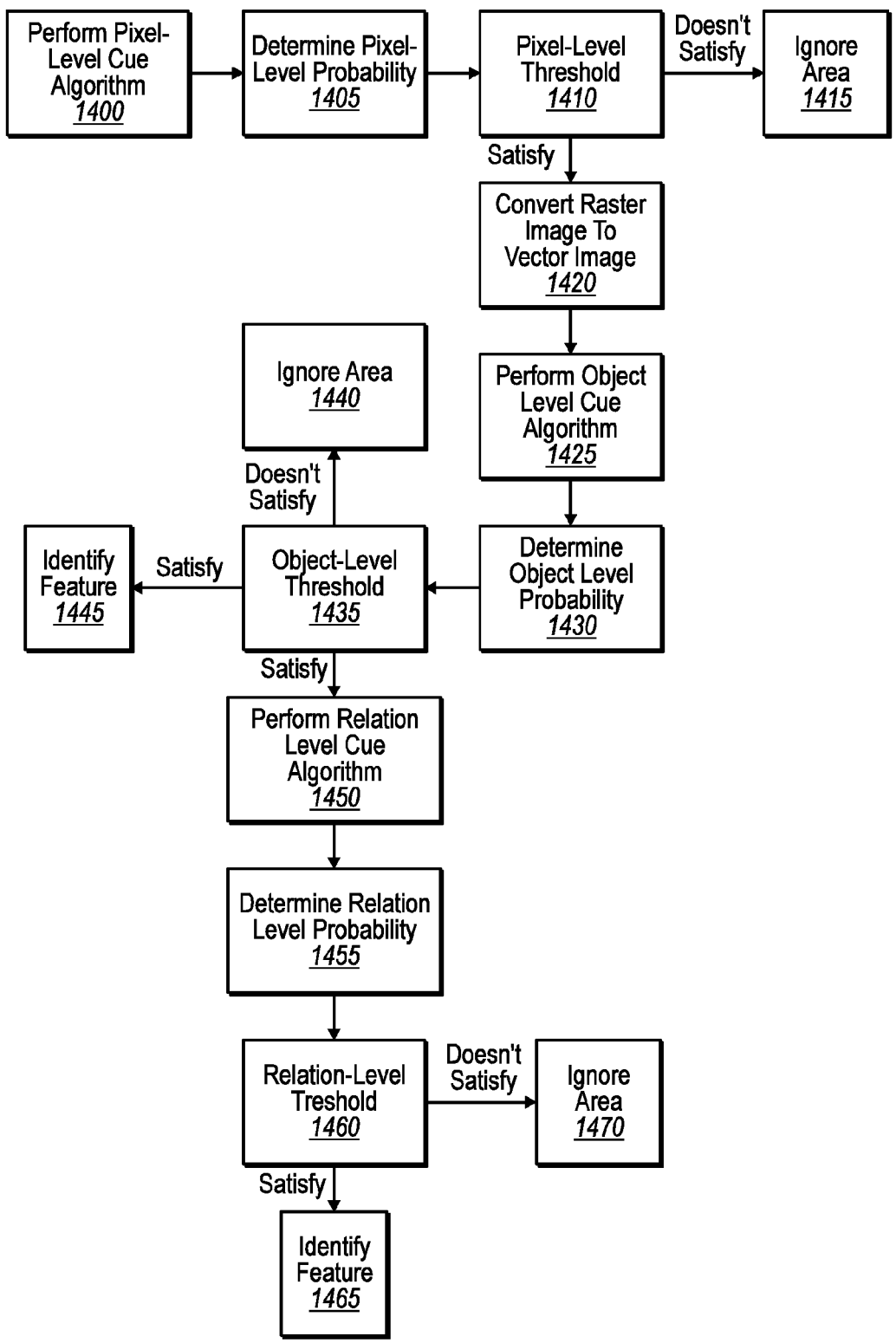
FIG. 14 illustrates a method for detecting a feature in a digital image.

Referring to FIG. 14, a method for detecting a feature in a digital image is illustrated. A pixel-level cue algorithm can be performed on raster image data to identify pixels (1400) with a high probability that the pixels are the features of interest. A pixel-level probability can be determined as to the probability that the pixels are the feature (1405). The pixel-level probability can be compared to a pixel-level threshold (1410). In the instance that the pixel-level probability does not satisfy the pixel-level threshold, the pixels can be discarded, or no longer considered within a zone of interest (1415). In the instance that the pixel-level probability satisfies the pixel-level threshold, the interesting pixels of the raster image can be converted to a vector image (1420) including a plurality of vector objects.

An object-level cue algorithm can be performed on the vector image to identify objects within high probability that the objects are the feature of interest (1425). An object-level probability can be determined as to the probability that the objects are the feature (1430). The object-level probability can be compared to an object-level threshold (1435). In the instance that the object-level probability does not satisfy the object-level threshold, the object can be discarded, or no longer considered within the zone of interest (1440). In the instance that the object-level probability satisfies the object-level threshold the object can be identified as the feature (1445). In several embodiments disclosed herein, the analysis ends here.

Optionally, relation-level analysis can be conducted. In the instance that the object-level probability meets the object-level threshold (1435) a relation-level cue algorithm can be performed (1450). A relation-level probability can be determined as to the probability that geospatial data is the feature (1455). The geospatial data can include raster, vector, metadata, probability attributes and any other geospatial data describing the usage. The relation-level probability can be compared to a relation-level threshold (1460). In the instance that the relation-level probability does not satisfy the relation-level threshold the geospatial data can be discarded or ignored as no longer in the zone of interest (1470). In the instance that the geospatial data satisfies the relation-level threshold the geospatial data can be identified as the feature (1465).

The feature can be identified using any of, or a combination of, the pixel-level analysis, the vector level analysis, and/or the relation-level analysis. When pixel or vector data is identified as the feature, additional steps can be taken to isolate the feature, extract information about the feature, and/or create geometric object data to superimpose over the original raster image data representing the feature. The object data can be two dimensional or three dimensional object data. Metadata may also be added to the geospatial data describing probability attributes that geospatial data is a feature of interest.

Detecting a feature in an image can be modeled after a human visual system where the detection processes imitate human visual image interpretation cues in a probabilistic system. Traditional statistical classifiers can be incorporated such as hyperspectral algorithms, standard image processing routines, object recognition functions, graphical information system (GIS) analysis, third party/user algorithms, etc. Analysis can be performed on pixels, objects, and relationships between pixels and objects, and can produce intelligent vectors. Embodiments can incorporate any amount of expert knowledge. Embodiments can learn from evidence and counter evidence. Embodiments can allow for incorporation for external libraries for spectral and shape matching. Embodiments can also be fully automated. Object and relation-level processors can be data independent, which can include additional automation. A measurement of uncertainty can be provided to a user along with results or stored in memory. Embodiments can be provided as commercial off-the-shelf (COTS) products.

Figure 15:
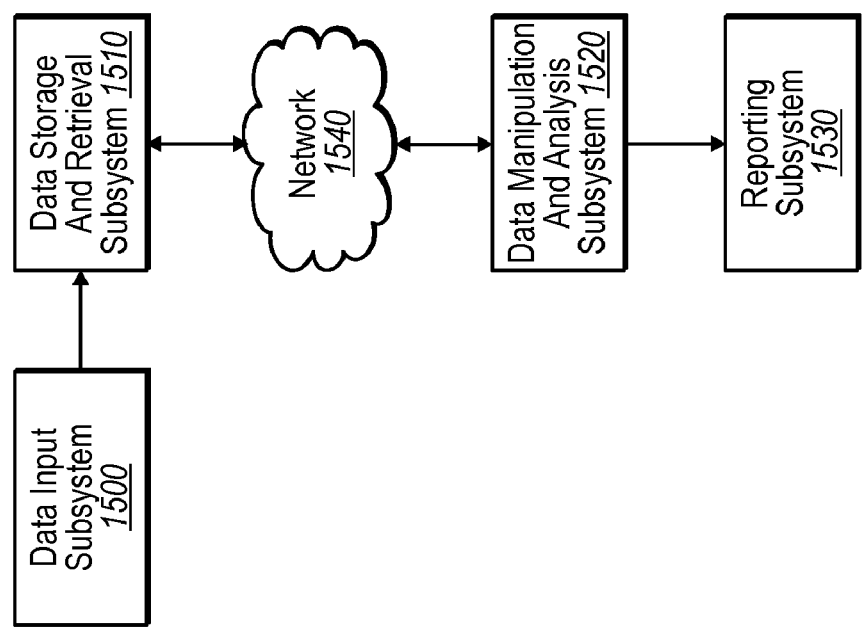
FIG. 15 is a block diagram illustrating various subsystems of a GIS according to an example embodiment.

Embodiments can be implemented in a GIS. Referring to FIG. 15, a block diagram is shown illustrating various subsystems of a GIS according to an example embodiment. A GIS can comprise several subsystems, such as a data input subsystem 1500, a data storage and retrieval subsystem 1510, a data manipulation and analysis subsystem 1520, and a reporting subsystem 1530. Any of these subsystems can be combined into a particular single assembly or device for accomplishing the described functions. Further, any of the subsystems described herein can be in communication with any of the other subsystems described herein. The particular embodiments described are for illustration of several aspects of example embodiments.

The data input subsystem 1500 can collect and perform preprocessing of the geospatial data received form various sources and input devices. The data input subsystem 1500 can be responsible for transformation of different types of geospatial data (e.g., from isoline symbols on a topographic map to point elevations). The data storage and retrieval subsystem 1510 can organize the geospatial data in a manner that allows for efficient storage, retrieval, updating, and editing. Additional information such as attribute and metadata information can also be stored.

The data manipulation and analysis subsystem 1520 can perform analysis of the geospatial data received, such as performing tasks on the geospatial data, perform aggregates and disaggregates, estimate parameters and constraints, and perform modeling functions. The data manipulation and analysis subsystem can also conduct image processes such as feature extraction according to various embodiments of the present invention. The reporting subsystem 1530 can display the geospatial data and display results of the feature extraction conducted in tabular, graphics, or map formats.

Communication between any of the subsystems can occur across a network (e.g. a LAN, a WAN, or the Internet) such as in an enterprise domain. For example, as illustrated in FIG. 15, the data storage and retrieval subsystem 1510 and the data manipulation and analysis subsystem 1520 can communicate across a network 1540. The data manipulation and analysis subsystem 1520 can access image data stored at the data storage and retrieval subsystem 1510, extract features from the image as described above, and stream a result of the extraction, for example including superimposed objects, back to the data storage and retrieval subsystem 1510 for storage. Images including superimposed objects and attribute tables can be printed, displayed, or otherwise presented to a user via the reporting subsystem 1530.

Figure 16:
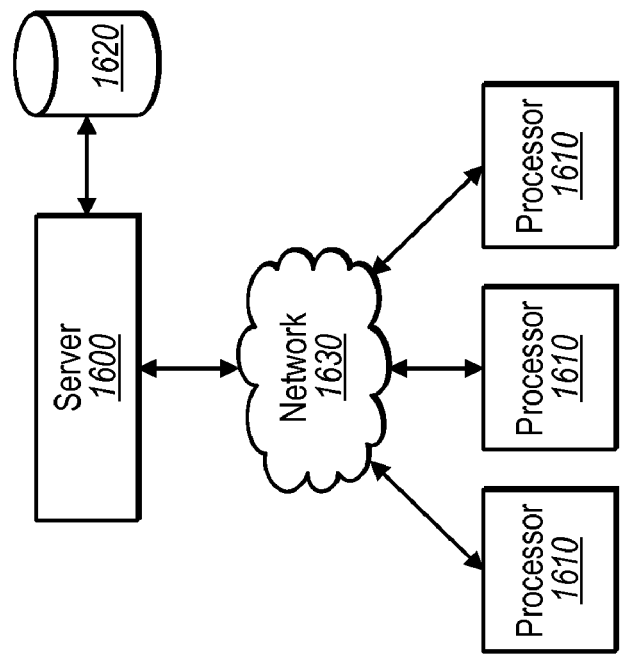
FIG. 16 is a block diagram illustrating a distributed GIS according to an example embodiment.

Referring to FIG. 16, a block diagram is shown illustrating a GIS according to an example embodiment. The GIS can include a server 1600 and several processors 1610. The server 1600 and processors 1610 can represent any of the GIS subsystems discussed above with reference to FIG. 15. Certain of the GIS subsystems may also be eliminated according to certain embodiments. For example, the processors 1610 can represent data manipulation and analysis subsystems as well as reporting subsystems. The server 1600 can represent a data storage and retrieval subsystem. The server can be coupled to memory 1620 for storage of data including object data, vector data, raster data, results of feature extractions, and/or other image data. It should be appreciated that additional hardware, memory, processors, and storage devices can be included, and the various types of data can be stored in a single data storage medium, or multiple data storage mediums.

As illustrated, the server 1600 can be located across a network 1630 (e.g. a LAN, WAN, and/or the Internet) for communication with any of the processors 1610. The processors 1610 can request data (e.g. object data, raster data, vector data, and/or other image data) from the server 1600. The server 1600 can receive the request and access the data in the data storage medium 1620. The server 1600 can stream the data including image data. Feature templates, cue metrics, parameters, training pixels, training vector objects, and other variables for feature extraction can also be streamed from the server 1600 to the processors 1610, or can be stored locally at the processors 1610 for example using plug-ins (DLLs). The server 1600 can represent an expert version in an enterprise domain and the processors 1610 can be executing analyst software versions as locally stored imagery.

The image data in the data storage medium 1620 can be organized. For example, the image data in the data storage medium 1620 can be organized according to quadtrees and image data located in a quadtree can be requested for extraction of features. The object data can also be organized, for example, based on attribute value, type of image, and type of features. The data storage medium 1620 can store feature models and feature templates.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 17:
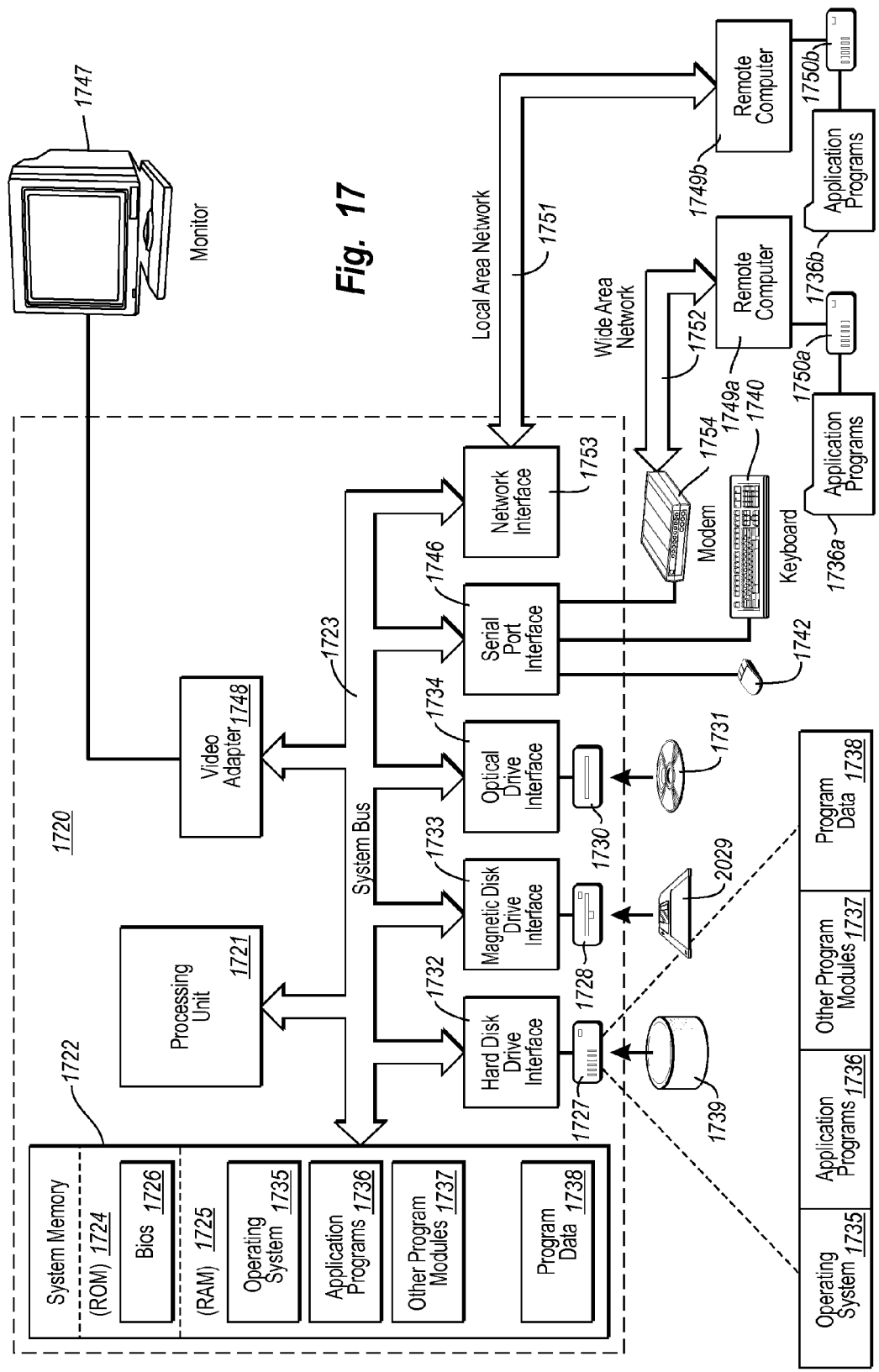
FIG. 17 illustrates a suitable computing environment in which several embodiments or aspects of the invention may be implemented.

FIG. 17 and the following discussion are intended to provide a brief, general description of a suitable computing environment in which several embodiments or aspects may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

The invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 17, an exemplary system for implementing the invention includes a general purpose computing device in the form of a conventional computer 1720, including a processing unit 1721, a system memory 1722, and a system bus 1723 that couples various system components including the system memory 1722 to the processing unit 1721. The system bus 1723 may be any of several types of bus structures including a memory bus or memory controller, a peripheral bus, or a local bus using any of a variety of bus architectures. The system memory includes read only memory (ROM) 1724 and random access memory (RAM) 1725. A basic input/output system (BIOS) 1726, containing the basic routines that help transfer information between elements within the computer 1720, such as during start-up, may be stored in ROM 1724.

The computer 1720 may also include a magnetic hard disk drive 1727 for reading from and writing to a magnetic hard disk 1739, a magnetic disk drive 1728 for reading from or writing to a removable magnetic disk 1729, and an optical disk drive 1730 for reading from or writing to removable optical disk 1731 such as a CD ROM or other optical media. The magnetic hard disk drive 1727, magnetic disk drive 1728, and optical disk drive 1730 are connected to the system bus 1723 by a hard disk drive interface 1732, a magnetic disk drive-interface 1733, and an optical drive interface 1734, respectively. The drives and their associated computer-readable media provide nonvolatile storage of computer-executable instructions, data structures, program modules and other data for the computer 1720. Although the exemplary environment described herein employs a magnetic hard disk 1739, a removable magnetic disk 1729 and a removable optical disk 1731, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 1739, magnetic disk 1729, optical disk 1731, ROM 1724 or RAM 1725, including an operating system 1735, one or more application programs 1736, other program modules 1737, and program data 1738. A user may enter commands and information into the computer 1720 through keyboard 1740, pointing device 1742, or other input devices (not shown), such as a microphone, joy stick, game pad, satellite dish, scanner, or the like. These and other input devices are often connected to the processing unit 1721 through a serial port interface 1746 coupled to system bus 1723. Alternatively, the input devices may be connected by other interfaces, such as a parallel port, a game port or a universal serial bus (USB). A monitor 1747 or another display device is also connected to system bus 1723 via an interface, such as video adapter 1748. In addition to the monitor, personal computers typically include other peripheral output devices (not shown), such as speakers and printers.

The computer 1720 may operate in a networked environment using logical connections to one or more remote computers, such as remote computers 1749a and 1749b. Remote computers 1749a and 1749b may each be another personal computer, a server, a router, a network PC, a peer device or other common network node, and typically include many or all of the elements described above relative to the computer 1720, although only memory storage devices 1750a and 1750b and their associated application programs 1736a and 1736b have been illustrated in FIG. 17. The logical connections depicted in FIG. 17 include a local area network (LAN) 1751 and a wide area network (WAN) 1752 that are presented here by way of example and not limitation. Such networking environments are commonplace in office-wide or enterprise-wide computer networks, intranets and the Internet.

When used in a LAN networking environment, the computer 1720 is connected to the local network 1751 through a network interface or adapter 1753. When used in a WAN networking environment, the computer 1720 may include a modem 1754, a wireless link, or other means for establishing communications over the wide area network 1752, such as the Internet. The modem 1754, which may be internal or external, is connected to the system bus 1723 via the serial port interface 1746. In a networked environment, program modules depicted relative to the computer 1720, or portions thereof, may be stored in the remote memory storage device. It will be appreciated that the network connections shown are exemplary and other means of establishing communications over wide area network 1752 for streaming GIS data may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a graphical information system (GIS), a method for processing a digital image depicting one or more physical objects to locate a feature in the digital image, the method comprising the following:

by a processor, executing a pixel-level cue algorithm to identify an interesting area of a raster image depicting the one or more physical objects;

determining a pixel-level probability that the interesting area of the raster image identified is the feature using a result from the pixel-level cue algorithm;

comparing the pixel-level probability to a pixel-level cue threshold; and if the pixel-level probability satisfies the pixel-level cue threshold:

converting at least a portion of the raster image to a vector layer by geometric modeling using points, lines, curves, and polygons to generate a representation of digital vector objects represented by the points, lines, curves and polygons;

executing an object-level cue algorithm on the vector layer to identify an interesting area of the vector layer;

determining an object-level probability that the interesting area of the vector layer is the feature using a result of the pixel-level cue algorithm; and comparing the object-level probability to an object-level threshold.

2. The method according to claim 1, further comprising:
if the object-level probability meets the object-level threshold:
   identifying the interesting area of the vector layer as the feature.

3. The method according to claim 1, further comprising:
if the object-level probability meets the object-level threshold:
   executing a relation-level cue algorithm on the vector layer to identify an interesting area of the vector layer;
   determining a relation-level probability for the interesting area of the vector layer using a result of the relation-level cue algorithm;
   comparing the relation-level probability to a relation-level threshold; and
   if the relation-level probability satisfies the relation-level threshold:
      identify the interesting area of the vector layer as the feature.

4. The method according to claim 3, wherein the relation-level cue comprises one of the members of a set comprising: a pattern cue; and an association cue.

5. The method according to claim 1, wherein a training cue metric is input by a user.

6. The method according to claim 5, wherein the cue metric is at least one of: a training pixel; and a training vector object.

7. The method according to claim 1, wherein:
the pixel-level cue comprises at least one of: a spectral cue; a texture cue; a vegetative cue; a site cue; a slope cue; an aspect cue; a landcover cue; a soil cue; a temperature cue; and a user defined pixel-level cue; and
the object-level cue comprises at least one of: a shape cue; a size cue; a orientation cue; a right angle cue; a template matching cue; an orthogonality cue; a perimeter cue; a length cue; a width cue; a boundary complexity cue; a rectangular fit cue; an elliptical fit cue; a compactness cue; a symmetry cue; a direction cue; a background cue; a spectral information of surrounding pixels cue; a textural information of surrounding pixels cue; an extent cue; an area cue; a shadow cue; a background cue; and a zonal cue.

8. The method according to claim 1, wherein the probabilities are calculated using one of: a Bayesian Network; Classification and Regression Trees; or a Neural Network.

9. The method according to claim 1, further comprising:
extracting the feature; and
generating geometric object data representing the feature.

10. The method according to claim 1, further comprising:
based on the results of the pixel-level cue algorithm, generating a pixel probability layer in which each pixel's value represents a probability that it is the feature of interest;
converting the pixel probability layer into a raster object layer which contains pixels that are grouped as raster objects; and
for each raster object calculating a mean probability of all of the probability pixels corresponding to each raster object.

11. The method according to claim 10, wherein at least a portion of the raster object layer is converted to a digital vector object layer by geometric modeling, wherein the geometric modeling uses geometric primitives including at least one of points, lines, curves and polygons to generate a representation of one or more digital vector layer objects represented by points, lines, curves and polygons.

12. The method according to claim 11, wherein each digital vector layer object is associated with the mean probability calculated from the raster object from which the vector object was converted.

13. A non-transitory computer-readable medium including computer-executable instructions for performing the method of claim 1.

14. In a graphical information system (GIS), a method for processing a digital image depicting one or more physical objects to locate a feature in the digital image, the method comprising the following:
by a processor, performing a pixel-level cue algorithm on a digital raster image, the raster image depicting the one or more physical objects by a set of pixels;
based on the results of the pixel-level cue algorithm, generating a pixel probability layer in which each pixel's value represents a probability that it is the feature of interest;
converting the pixel probability layer into a raster object layer which contains pixels that are grouped as raster objects;
for each raster object, calculating a mean probability of all of the probability pixels corresponding to each raster object;
converting at least a portion of the raster object layer to a digital vector layer by geometric modeling, wherein geometric modeling uses geometric primitive including points, lines, curves and polygons to generate a representation of digital vector objects represented by the points, lines, curves and polygons, and wherein each digital vector layer object is associated with the mean probability calculated from the raster object from which the vector object was converted;
performing an object-level cue algorithm on the digital vector layer representation of the one or more digital vector layer objects; and
identifying a feature using a result of the pixel-level cue algorithm and a result of the object-level cue algorithm performed.

\* \* \* \* \*